(12) United States Patent
Huffschmid

(10) Patent No.: US 7,539,178 B2
(45) Date of Patent: May 26, 2009

(54) CONNECTION OF USERS IN HYBRID COMMUNICATION NETWORKS

(76) Inventor: Norbert Huffschmid, Salzstr. 9, 82110 Germering (DE)

( * ) Notice: Subject to any disclaimer, the term of this patent is extended or adjusted under 35 U.S.C. 154(b) by 330 days.

(21) Appl. No.: 10/566,778

(22) PCT Filed: May 4, 2004

(86) PCT No.: PCT/EP2004/050688

§ 371 (c)(1),
(2), (4) Date: Jan. 31, 2006

(87) PCT Pub. No.: WO2005/013577

PCT Pub. Date: Feb. 10, 2005

(65) Prior Publication Data

US 2006/0239242 A1    Oct. 26, 2006

(30) Foreign Application Priority Data

Aug. 1, 2003    (EP) .................................. 03017482

(51) Int. Cl.
*H04L 12/66* (2006.01)
(52) U.S. Cl. .................................. 370/352; 379/202.01
(58) Field of Classification Search ................. 370/338, 370/352
See application file for complete search history.

(56) References Cited

U.S. PATENT DOCUMENTS 6,577,622 B1 * 6/2003 Schuster et al. ............. 370/352
7,193,987 B2 * 3/2007 Vilander ..................... 370/338
2003/0007460 A1   1/2003 Pinard et al.
2004/0184432 A1 * 9/2004 Gateva et al. ............... 370/349
2006/0050711 A1 * 3/2006 Lialiamou et al. ......... 370/395.2

FOREIGN PATENT DOCUMENTS

WO    WO 03/054717 A1    7/2003
WO    WO 03/061242 A1    7/2003

OTHER PUBLICATIONS

David Schwartz, "RE: Sipping! Re: Update to 3pcc—corrected", IETF Mail Archive Working Groups, 'Online', Jul. 30, 2003, pp. 1-4, Retrieved from Internet: URL:http://www1.ietf.org/mail-archieve/working-groups/sipping/current/msg05032.html>, Retrieved Dec. 11, 2003, XP002264760.

(Continued)

*Primary Examiner*—Creighton Smith
(74) *Attorney, Agent, or Firm*—Laurence A. Greenberg; Werner H. Stemer; Ralph E. Locher

(57) ABSTRACT

Data for identifying users is detected by a Server, which is preferably connected to the Internet, in order to connect two users is provided. The server establishes a first signaling connection to user A and a second signaling connection, to user B by taking into account said data, whereupon the server combines the two signaling connections to a continuous signaling connection, allowing a continuous signaling connection to be established in which fees are charged by server S rather than by user A, whereby alternative options become available for charging for a traffic channel connection allocated to the continuous signaling connection.

16 Claims, 2 Drawing Sheets

OTHER PUBLICATIONS

J. Rosenberg, J. Peterson, H. Schulzrinne, G. Camarillo, "Best Current Practices for Third Party Call Control in the Session Initiation Protocol (draft-ietf-sipping-3pcc-04)", IETF Internet Draft, 'Online', Jun. 30, 2003, pp. 1-34, Retrieved from Internet: URL:http://www.ietf.org/proceedings/03jul/I-D/draft-ietf-sipping-3pcc-04.txt>, Retrieved Dec. 11, 2003, XP002264759.

Tsun-Chieh Chiang, Vijay K. Gurbani and John B. Reid, "The Need for Third-Party Call Control", Bell Labs Technology, Bell Laboratories, Murrey Hill, NJ, US, vol. 7, No. 1, 2002, pp. 41-46, XP001125123.

Bert Culpepper, "Sip-implementors! Sip certain questions on third party call control . . . 2!", SIP Implementors List, 'Online', Sep. 25, 2002, pp. 1-4, Retrieved from Internet: URL://lists.cs.columbia.edu/pipermail/sip-implementors/2002-September/003891.html>, Retrieved on Dec. 11, 2003, XP002264761.

Rosenberg, Peterson, Schulzrinne and Camarillo, "Third Party Call Control in SIP", IETF Internet Draft, Nov. 21, 2001, pp. 1-20, Retrieved from Internet: URL:http://standards.ericsson.net/g...draft-rosenberg-sip-3pcc-03.txt>, Retrieved Oct. 9, 2002, XP002216048.

* cited by examiner

CONNECTION OF USERS IN HYBRID COMMUNICATION NETWORKS

CROSS REFERENCE TO RELATED APPLICATIONS

This application is the US National Stage of International Application No. PCT/EP2004/050688, filed May 4, 2004 and claims the benefit thereof. The International Application claims the benefits of European application No. 03017482.5 EP filed Aug. 1, 2003, both of the applications are incorporated by reference herein in their entirety.

FIELD OF INVENTION

This invention relates to a connection of subscribers within hybrid communication networks.

BACKGROUND OF INVENTION

In the past, two important types of communication network for transferring information have developed: packet-oriented (data) networks and line-oriented (voice) networks. The convergence of these two network types has led to the development of convergent (voice-data) networks. Merging these different network types has resulted in hybrid networks, in which the subject matter of the present invention is utilized with particularly noteworthy advantages.

Line-oriented networks—also called voice networks or telephone networks—are designed for the transfer of continuously streaming (voice) information, this being referred to as a call or session by experts. In this type of activity, the information transfer is usually characterized by a high quality of service and reliability. For example, a minimal delay—e.g. <200 ms—without delay time fluctuations (delay jitter) is important for voice, since voice requires a continuous information flow when it is reproduced in the receiving device. Therefore an information loss cannot be compensated by re-transferring the information which was not transferred, and usually results in acoustically noticeable crackling. Experts generally refer to the transfer of voice as a 'realtime service'. transfer of packet streams, which are also referred to as 'data packet streams' or 'flow' by experts. In this type of activity, it is not usually necessary to guarantee a high quality of service. Without a guaranteed quality of service, the transfer of the data packet streams is subject to e.g. temporally fluctuating delays, since the individual data packets of the data packet streams are usually transferred in the sequence in which they enter the network, i.e. the time delays increase in accordance with the number of packets that must be transferred by a network. Therefore experts also refer to the transfer of data as a transfer service without realtime conditions or as a 'non-realtime service'.

Depending on the type of packet-oriented network, the packets can be configured as e.g. Internet packets, X.25 packets, frame-relay packets, or even ATM cells. They are sometimes also referred to as messages, primarily if a message is transferred in a packet.

A well-known data network is the Internet. This is also called an IP network sometimes, due to the Internet protocol IP which is used there, wherein this term should generally be understood to have a broad sense and include all networks in which the IP protocol is used. The Internet is designed as an open (wide area) data network having open interfaces for connecting (mainly local and regional) data networks of different manufacturers. It provides a manufacturer-independent transport platform.

Connections are communication links between at least two subscribers for the purpose of two-way information transfer. The subscriber initiating the connection is normally called the 'A-subscriber'. A subscriber who is connected to an A-subscriber as a result of a connection is called a 'B-subscriber'. In a connectionless network, connections represent at least the relationship between A-subscriber and B-subscriber, said relationship being specific on a logically abstract level, i.e. the connectionless flows in the Internet, for example, represent logically abstract connections accordingly (e.g. A-subscriber=browser and B-subscriber=web server). In a connection-oriented network, connections represent paths through the network, along which paths the information is transferred, said paths also being specific on a physical level.

As a result of the convergence of voice and data networks, packet-oriented networks are likewise being used for implementing voice transfer services and increasingly also for implementing services that require more bandwidth such as e.g. transfer of moving-image information, i.e. the transfer of realtime services which previously usually involved line-oriented transfer takes place in a convergent network—also called a voice-data network—in a packet-oriented manner, i.e. in packet streams. These are also called realtime packet streams. In this case, the transfer of voice information via a packet-oriented IP network is also called 'VoIP' (Voice over IP).

A plurality of architectures for voice-data networks are described in the international standardization bodies IETF (International Engineering Task Force) and ITU (International Telecommunications Union). It is common to all that the Call Control layer and the Resource Control Layer are clearly separate from each other in functional terms.

In this case, the Call Control layer comprises at least one (optional) Call Controller, to which inter alia the following functions are assigned:

Address Translation: conversion of E.164 telephone numbers and other alias addresses (e.g. computer names) into transport addresses (e.g. Internet addresses).

Admission Control (optional): basic validity check for determining whether and to what extent (e.g. VoIP-compatible) entities are allowed to utilize the communication network.

Bandwidth Control (optional): management of transfer capacities.

Zone Management: registration of (e.g. VoIP-compatible) entities and provision of above functions for all entities registered at the Call Controller.

In addition, the following functions can optionally be assigned to a Call Controller if necessary:

Call Control Signaling: all signaling messages are switched by at least one Call Controller, i.e. all entities send and receive signaling messages only via the Call Controller. Any direct exchange of signaling messages between the entities is prohibited.

Call Authorization: validity check for incoming and outgoing calls.

Bandwidth Management: controlling the permitted number of entities which are allowed to utilize the communication network concurrently.

Call Management: managing a list of current calls, e.g. so that it is possible to generate a busy tone if this cannot be generated by the entity itself.

Alias Address Modification: returning a modified Alias Address, e.g. with an H.225.0 message ACF (Admission Confirmation). The endpoint must use this address during connection setup.

Dialed Digit Translation: translating the dialed digits into an E.164 telephone number or into a number from a private numbering model.

The 'Gatekeeper' proposed by the ITU in the H.323 family of standards or the 'SIP Proxy' proposed by the IETF are examples of Call Controllers. If a larger communication network is split into a plurality of domains or 'zones', a separate Call Controller can be provided in each domain. It is also possible to operate a domain without a Call Controller. If a plurality of Call Controllers are provided in a domain, only one of these Call Controllers should be activated. From a logical viewpoint, a Call Controller should be considered as separate from the entities. In physical terms, however, it does not have to be implemented in a separate Call Controller entity, but can also be provided in any endpoint of a connection (e.g. designed as an H.323 or SIP endpoint, terminal, media gateway, multipoint control unit), or even in an entity which is primarily designed for program controlled data processing (e.g. computer, PC, server). A physically distributed implementation is also possible.

The Resource Control layer comprises at least one Resource Controller, to which inter alia the following functions are assigned:

Capacity Control: controlling the traffic volume which is supplied via packet streams to the communication network, e.g. by monitoring the transfer capacity of individual packet streams.

Policy Activation (optional): reserving resources in the communication network for transfer of a prioritized packet stream if necessary.

Priority Management (optional): according to the priority of their packet streams, setting and monitoring priority flags in the packets and, if the packets are already flagged with priorities, possibly correcting priority flags in the packets.

The Resource Controller is also called a 'Policy Decision Point (PDP)'. It is implemented within so-called Edge Routers, for example, these being known also as Edge Devices, Access Nodes or even Provider Edge Routers (PER) when assigned to an Internet Service Provider (ISP). These Edge Routers can also be designed as Media Gateways to other networks, to which the voice-data networks are connected. These Media Gateways are then connected to both a voice-data network and the other networks, and are used internally for converting between the different protocols of the various networks. The Resource Controller can also be designed solely as a proxy, and forward information that is relevant to the Resource Controller to a separate entity on which the Resource Controller is implemented.

The fundamental interaction between Call Controller and Resource Controller as per the Session Initiation Protocol (SIP) of the IETF or the H.323 protocol family of the ITU is explained using the example of a Call Setup between two VoIP entities which are designed as subscriber terminals. A homogeneous voice-data network is initially taken as a starting point in this case.

As part of the Call Setup, or sometimes even prior to the actual Call Setup, the authentication, authorization and (start of) accounting steps are executed when a terminal dials into the IP network (e.g. via an Internet Service Provider). This so-called 'AAA' functionality is usually performed by accessing a subscriber database in which all users are stored, including their identification codes, passwords, permissions, etc. This access is slow and comparatively complex. In the "Best Effort" IP networks of today, this AAA procedure normally takes place once while the user dials in. A further authentication takes place when a Call Controller is used, if the terminal registers at the Call Controller of the Internet Service Provider. According to the ITU standard H.323, this authentication or registration of a terminal at the assigned Gatekeeper is carried out as per the RAS (Registration, Admission, Status) protocol which is described in the ITU standard H.225.0.

The actual Call Setup usually starts in a first step in which the terminals of the subscribers exchange their capabilities (e.g. list of supported CODECs) in order to specify the necessary resources (e.g. bandwidth) and the QoS (e.g. delay, jitter) that is required. The terminals are designed as e.g. IP telephones in the case of voice telephony, and in the case of online video one of the terminals would be designed as a content or application server, e.g. in the network of the ISP.

The exchange of the signaling messages takes place either directly between the devices or via Call Controller switching. In this context, the variant that utilized in the case of each call is individually specified for each terminal and for each transfer direction. The first variant is also called 'Direct Endpoint Call Signaling' in the H.323 terminology and the second as 'Gatekeeper Routed Call Signaling'. In the case of Direct Endpoint Call Signaling, copies of selected signaling messages can be transferred to a Call Controller if necessary, such that a Call Controller is also often aware of the resource and QoS requirements that are agreed between the terminals. However, these requirements are not actively influenced or verified by said Call Controller.

In a second, optional step, the resource and QoS requirement which is agreed in this way can be transferred directly from the terminals of the subscribers to their assigned Resource Controller. After checking the resource and QoS requirement, a confirmation (or rejection) is sent back to the terminal from the Resource Controller.

In a third step which is likewise optional, a policy is activated in the Edge Router and if applicable in other routers in the network, by means of which policy these routers check and ensure that the traffic caused by the terminal is within the limits that were specified in the requirement. An example of such a reservation mechanism is RSVP (resource ReSerVation Protocol).

In order to carry out the three steps a plurality of messages are sent, said messages being used solely for reciprocal agreement among the participating components, and not for transferring the "actual information" between the terminals. This information which is transferred with the messages is usually called signaling information, signaling data, or simply signaling. In this case, the term must be understood in a broad sense. Therefore, for example, the messages as per the RAS protocol, the messages as per the ITU standard H.245 for controlling speech/data channels of existing calls, and all further similarly formed messages are included in addition to the signaling messages. The signaling protocol for the connection setup (call setup) and connection release (call release) according to the ITU is described in the standard H.225.0, for example, and the signaling protocol according to the IETF is described in RFC 2453bis ("SIP: Session Initiation Protocol"). In order to differentiate from the signaling, the "actual information" is also called user information, payload, media information, media data or simply media.

Communication links which are used for transferring the signaling are subsequently called signaling connections. The communication links which are used for transferring the user information are referred to as e.g. voice connection, speech/ data channel connection or—more simply—speech/data channel, bearer channel or simply bearer.

SUMMARY OF INVENTION

If such a convergent voice-data network is combined with a conventional line-oriented voice network, new technical problems arise when information is transferred beyond the boundaries of the networks concerned as a result of the different technologies which are used in the relevant network types.

An object of the invention is to recognize at least one of these problems and to enrich the prior art by specifying at least one solution.

The invention poses the question of why VoIP technology has not yet managed to establish itself universally as an alternative to conventional line-oriented telephone networks. Whereas VoIP has already been able to establish itself within private (company) networks, this has not yet taken place in public networks, which are also called Public Switched Telephone Networks (PSTN). The continuous expansion of so-called messenger applications on privately used computers—also called Personal Computers (PC)—has admittedly made it possible to set up voice connections from PC to PC in the meantime. But telephone calls from the PC into the public telephone network are still not widespread.

According to the invention, one reason for this slow expansion of VoIP in hybrid networks which also include a public telephone network is the accounting. When the connection is transferred to the PSTN, costs are incurred for the operator of the PSTN, and these must ultimately be borne by the calling subscriber. However, it is difficult clearly to identify this subscriber and subsequently to charge him/her for the cost of the call, and this has not yet been satisfactorily resolved.

It is known that VoIP subscribers can install client software on their PCs and then use this software in order to register at the central communication server of their VoIP provider (e.g. MSN, Yahoo). Since all users of a specific client software normally register at the same central server, it is comparatively easy in technical terms to create communication links between all registered subscribers. Since these connections remain within the IP network, there is also no incurring of call costs which must be charged to the subscribers.

The situation is different if users want to establish a call in the PSTN using such a client software. In this case, the VoIP provider must route the connection via a Media Gateway to a specific PSTN. The PSTN operator normally has an accounting agreement with the VoIP provider in this case, so that the connection costs that are incurred can be charged to the VoIP. The VoIP provider will in turn ask for the money from the user of the client software.

This method has disadvantages at least for two of the parties involved:

The network of the PSTN operator must be connected to a multiplicity of different VoIP providers by the PSTN operator. Furthermore, the PSTN operator must establish an individual accounting procedure for each of these VoIP operators. In spite of this, however, the PSTN operator cannot directly address the VoIP subscribers, e.g. in order to advertise the services of the PSTN operator or to levy direct charges, since the PSTN operator has no reliable means of subscriber identification.

In respect of PSTN connections, the VoIP subscriber is dependent on the conditions offered to him/her by the VoIP concerned. This restricts the flexibility of the VoIP subscriber if the network connectivity via Media Gateway is only implemented to the PSTN of one PSTN operator or a few PSTN operators. This restriction becomes more significant in the case of a VoIP provider having a worldwide presence, if this reduced selection of PSTN operators applies in many countries.

A solution to this problem, said problem being that which is addressed by the invention, is specified in the patent claims.

A multiplicity of advantages are associated with this solution:

As a result of assigning the subscriber identification to a server, the previously inflexible configuration, in which the identity of a VoIP subscriber is only known to his/her allocated VoIP provider, is resolved. This grater flexibility allows other configurations in which, depending on their formation, the identity of the A-subscriber can also be known to others in addition to the VoIP provider. In particular, one such other can also be a PSTN operator.

As a result of the setup of the signaling connection in the PSTN being moved to the server, wherein said signaling connection previously started from the VoIP operator following the connection request of the A-subscriber, the accounting is separated from the VoIP provider because the accounting is normally attributed to the entity which initiates the setup of a connection, i.e. the server operator and no longer the VoIP operator in the present case.

If server and VoIP operator are separated, a PSTN operator can directly acquire end customers for the service of the PSTN operator without having to collaborate with a VoIP provider.

This separation allows a centralization in which provision is made for fewer servers than VoIP providers. In this case, the number of servers for which an individual accounting procedure must be established by the PSTN operators is reduced, whereby one of the problems recognized by the invention is advantageously solved.

In the case of the option of a centralization of the server, which option is made possible by the invention, the then smaller number of servers, said servers moreover possibly being in competition with each other, means that an interface to a plurality of PSTN operators can be expected because the number of interfaces decreases and is therefore easier to manage and because the competition, resulting from the differentiation which then exists between the various servers, encourages the development of a wide offer of PSTN operators. This reduces the problem of the VoIP subscriber being restricted in his/her selection of PSTN operators.

Further advantageous embodiments of the invention are derived from the dependent claims.

When the server is designed as a WEB application, i.e. as a computer program which can be freely accessed by any up-to-date browser (e.g. Microsoft Internet Explorer, Netscape Communicator) by entering a globally unique URL, there is a complete separation between the physical network access of subscribers and the arrangement of the server. This means that in principle the server can be positioned at any location worldwide.

When capturing the IP address of a subscriber who is accessing the WEB application, this can be taken from the incoming IP packets automatically, such that advantageously no manual input of the IP address is required. In this case, it is only necessary to manually capture that data by means of which the called subscriber is identified.

By means of a query to the subscriber whose IP address is known it is possible to determine which client software is used by this subscriber for utilizing VoIP. This has the advantage that the VoIP subscriber no longer has to install a special client software as is still customary today. It is no longer necessary for the VoIP subscriber to commit to a specific VoIP provider and install the client of said VoIP provider on his/her PC, whereby the VoIP subscriber is committed to those PSTN operators having an accounting procedure with the VoIP provider. Instead, the VoIP subscriber can search among a multiplicity of PSTN operators for that one which suits his/her needs and be charged directly by that PSTN operator.

As a result of specifying the identity of a subscriber, e.g. by relating the subscriber's characterizing data to an existing registration database, it is possible to perform direct accounting in relation to said subscriber using the data which is stored in the registration database. This is preferably made possible by the server supporting the setup of a bearer and the duration of the bearer's existence being recorded by means of an accounting data record. In order to avoid inconsistent accounting data records, the existence of the bearer is preferably monitored using a timer mechanism in this case, wherein said mechanism can be designed as e.g. a watchdog and comes from the server.

Noteworthy advantages can be derived if the server is assigned to a PSTN operator. In the ideal case, a PSTN operator can even charge the customers of the PSTN operator for the incurred call charges directly via the normal telephone bill without any registration. For example, a VoIP subscriber accesses VoIP servers of Deutsche Telekom via T-DSL and T-Online, said servers being in accordance with the invention. The Deutsche Telekom server can then definitively deduce the PSTN telephone account of the subscriber by means of the IP address which is managed by T-Online for the VoIP subscriber. It is then possible to dispense with a separate procedure for authentication of the subscriber.

BRIEF DESCRIPTION OF THE DRAWINGS

The invention is explained below with reference to further exemplary embodiments which are also illustrated in the figures, in which.

DETAILED DESCRIPTION OF INVENTION

Figure 1:
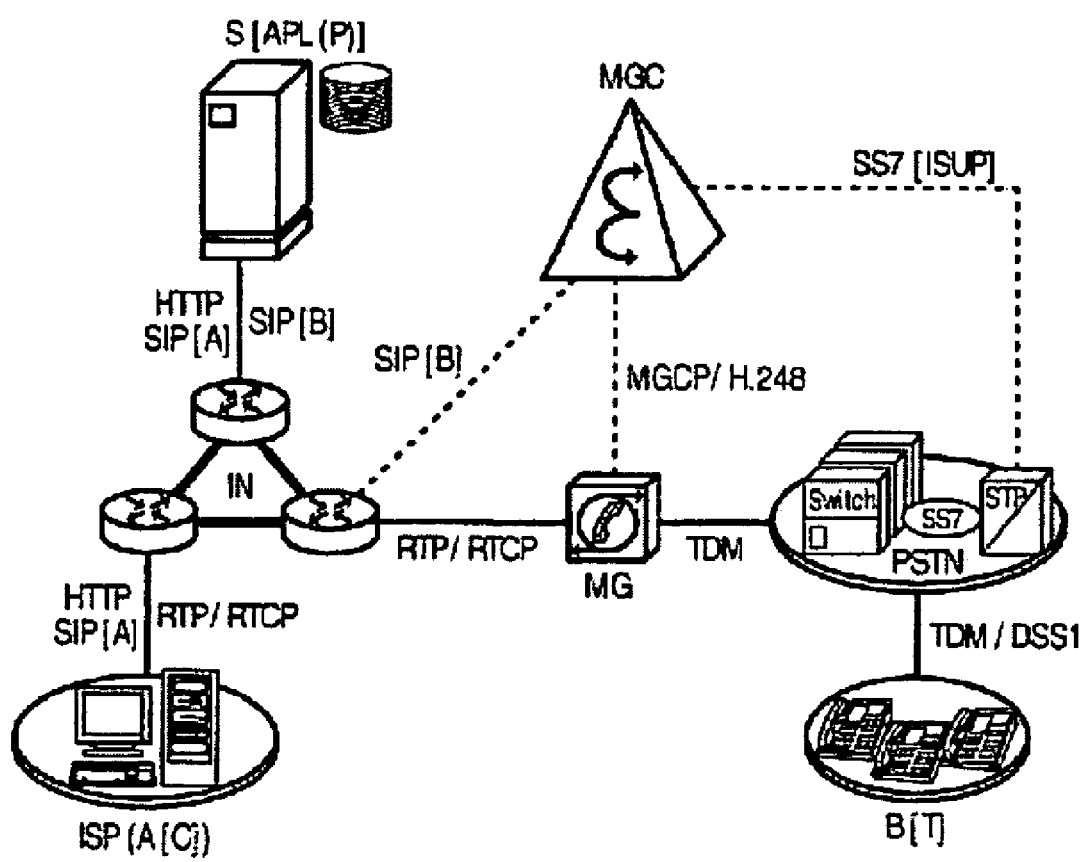
FIG. 1 shows an arrangement for performing the claimed method in a hybrid communication network, comprising a packet-oriented Internet, a line-oriented PSTN, an interconnected Media Gateway and Media Gateway Controller, and two endpoints of an information transfer.

In FIG. 1, an exemplary arrangement for performing the claimed method is illustrated. It is emphasized that, despite the sometimes precise detail of their representation in this case, the embodiments which are shown according to the invention are merely exemplary in nature and must not be understood as being restrictive. The arrangement comprises a line-oriented communication network PSTN and a packet-oriented network IN, which are combined to form a hybrid network by means of an interconnected Media Gateway for converting between different network-specific speech/data channel technologies RTP/RTCP (Real Time [Control] Protocol) and TDM (Time Division Multiplex) and an interconnected Media Gateway Controller for converting between different network-specific signaling protocols SIP (Session Initiation Protocol) and SS7 (Signaling System No. 7). In this case, the gateway MG is controlled by the controller MGC using a—preferably international standard—protocol, e.g. MGCP (Media Gateway Control Protocol) or H.248. The network IN is preferably designed as the Internet. It is obvious to a person skilled in the relevant art that the invention can of course be used in further packet-oriented networks, e.g. Intranet, Extranet, a Local Area Network (LAN) or a corporate network which is designed as e.g. a Virtual Private Network (VPN).

A server S which can be accessed e.g. using an IP-based protocol HTTP is connected to the network IN. The server S includes e.g. applications APL which are designed as computer program product P, in particular WEB applications which include software code sections for (multi-) processor supported execution of the claimed method. Optionally, parts of the computer program product P can also be implemented with the aid of special hardware (e.g. signaling processors) in this case. Assigned to the server is a subscriber database for the identification, registration and/or verification of subscribers and their permissions, which can be accessed e.g. using a corresponding protocol LDAP (Lightweight Directory Access Protocol).

A first subscriber A is assigned to the network IN and a second subscriber B is assigned to the network PSTN. The access to the network IN is effected with the aid of a known IP connection technology (e.g. IP over xDSL, controlled by the protocol PPP and switched through an interconnected ISP for dynamic allocation of IP addresses for the unique addressing of the subscriber A in the network IP, said addressing having a limited duration in most cases), and that to the network PSTN is effected with the aid of a known TDM connection technology (e.g. ISDN, controlled by the protocol DSS1).

Figure 2:
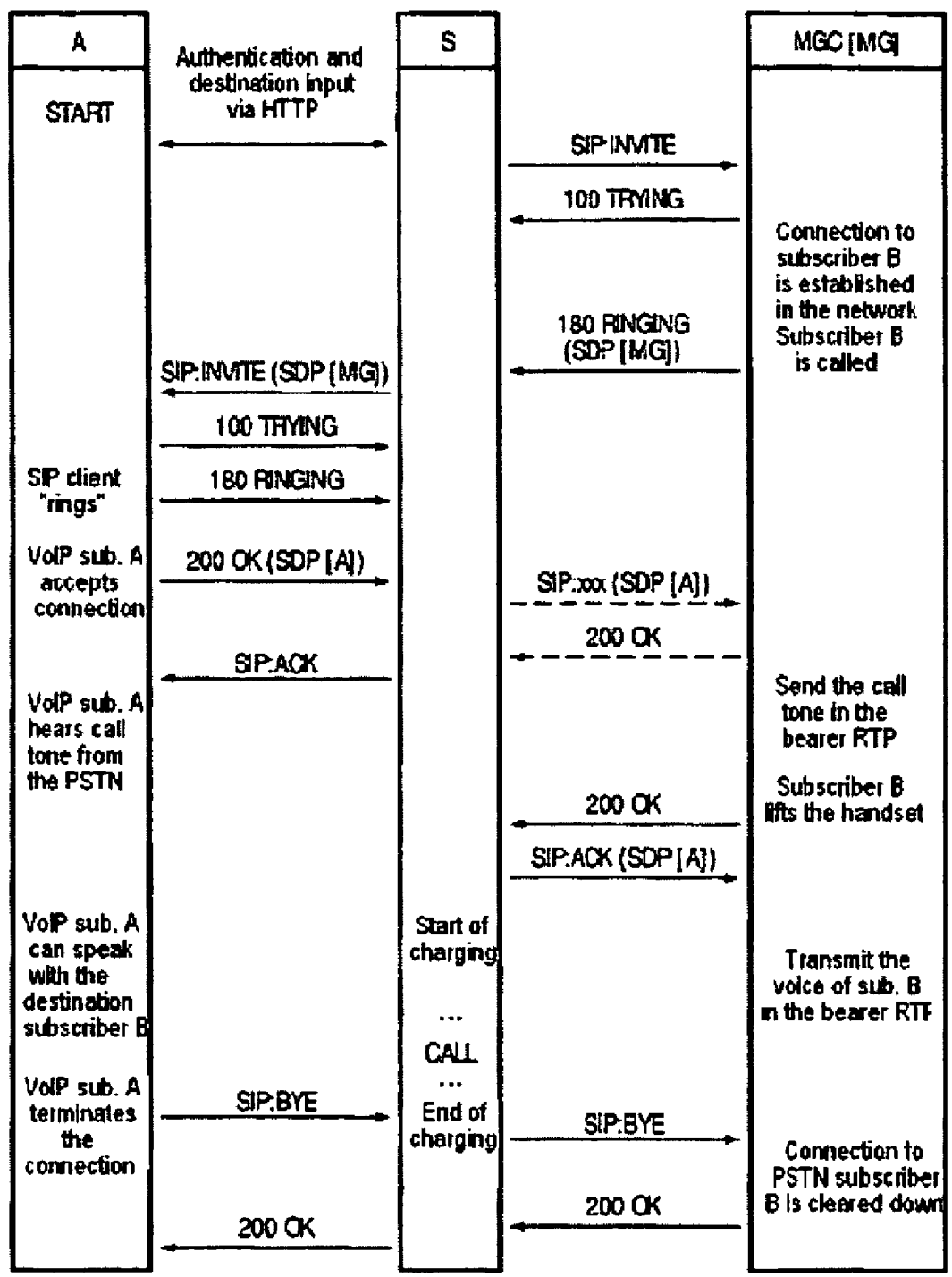
FIG. 2 shows a flow diagram in which an embodiment of the claimed method is illustrated as an example.

In FIG. 2, an embodiment of the claimed method is illustrated with reference to a flow diagram, using the example of an exemplary temporal sequence of a call CALL between the two subscribers A, B. The diagram shows standardized (signaling) messages SIP:INVITE, 100 TRYING, 180 RINGING, 200 OK, SIP:ACK AND SIP:BYE for exchanging signaling data between the subscriber A, the server S and the controller MGC. These messages are taken from the standardized protocol SIP, which was developed by the IETF for controlling connections RTP between endpoints of an RTP connection. In the present exemplary flow diagram, these endpoints are developed as subscriber A and gateway MG. It is obvious to a person skilled in the art that other signaling protocols, e.g. those of the protocol family H.323, can be used with equivalent effect.

In a further exemplary embodiment of the invention, interworking is performed between the VoIP subscriber A (or the client C of said VoIP subscriber A), the server B, the controller MGC, the gateway MG endpoint A and the PSTN subscriber B (or the telephone T of said PSTN subscriber B), wherein it is made possible for a PSTN operator to offer connections from VoIP subscribers to PSTN subscribers in the network of the PSTN operator, and to charge the initiating VoIP caller directly. In this case, the underlying network configuration for the example is shown in FIG. 1, wherein the following assignments are assumed:

Components of the PSTN operator:
the line-oriented network PSTN;
the Media Gateway Controller MGC—also called IP-PSTN gateway here (e.g. a hiQ9200 from the company Siemens);
at least one Media Gateway MG (e.g. a hiF1200 from the company Siemens).

Components which the VoIP subscriber A uses to support his/her access to the network IN:
an existing online connection via an (or his/her) Internet provider ISP to the packet-oriented Internet IN;
any web browser (e.g. Internet Explorer from the company Microsoft);

any installed VoIP client C (e.g. a SIP Sigma client from the company Siemens).

Furthermore, this exemplary embodiment includes use of a WEB and/or application server S according to the invention, said server being preferably assigned to the PSTN operator.

In the described scenario, the server S communicates both with the IP-PSTN gateway MGC and with the VoIP client C of the subscriber A via the standardized SIP protocol (Session Initiation Protocol). However, the described method is essentially only possible if other signaling protocols are used, e.g. by means of the H.323 protocol.

The implementation of the server S includes a web server for supporting the HTTP protocol and an application server for carrying out the method according to the invention. By way of example, the server S is designed as a single physical server (called web/application server). Both components can equally well be located on different servers which are networked together.

In order to establish a connection to the PSTN subscriber B, the VoIP subscriber A goes to a web page of the operator of the server as a result of entering a specific URL using his/her browser at the time point START, a graphical user interface of the application APL being provided by means of said web page. An authentication of the subscriber A is optionally performed by the server S accordingly. A plurality of possibilities exist for this purpose:

The subscriber A registers once at the server S and then logs on using user name and password for each subsequent access to the server S.

The subscriber identification takes place automatically, e.g. with reference to the IP address of the subscriber A. The server S can recognize the IP address of the subscriber, e.g. with reference to the HTTP messages which are received from the subscriber A, said messages normally containing the IP address of the subscriber A as identification of the source of the message. This automation is possible, for example, if the PSTN operator is identical to the ISP of the VoIP subscriber A or cooperates with said ISP.

Next, the technical possibilities or the availability of the VoIP subscriber A can optionally be determined by the server S, in order to ascertain whether and—if yes—how the VoIP client can be called. A plurality of possibilities likewise exist for this purpose:

The subscriber A submits his/her address in a form and the web/application server S saves this data in a profile of this subscriber A, said profile being stored in the subscriber database.

The web/application server S performs an automatic client identification. For this purpose, it can send e.g. a SIP: OPTIONS message to the port 5060 of the subscriber PC and, on the basis of a received reply, identify whether and—if yes—what sort of client C is installed on the PC of the VoIP subscriber A. If no client is installed or initiated, it is not possible to establish a signaling connection SIP [A].

The type of the client can also be used for adapting the sequence shown in FIG. 2 according to the specified characteristic features of the client C, e.g. by means of an alternative transfer of data SDP.

As a result of this, the VoIP subscriber A enters the call number of the desired PSTN subscriber B into a form in his/her browser. Alternatively, the PSTN operator can also offer a telephone book service, via which a simple click on a specific entry results the connection being established between the two subscribers A, B. The web/application server S determines the relevant IP-PSTN gateway MGC from this address information.

The following step shows a clear difference in comparison with previous VoIP connections: whereas the A-subscriber (or his/her assigned VoIP operator) normally establishes a (signaling) connection to a B-subscriber, in the scenario which is described here the web/application server S initiates two separate signaling connections, a first SIP [A] to the VoIP subscriber and a second SIP [B], SS7, DSS1 to the subscriber B, and subsequently links these together to form a continuous signaling connection SIP, SS7 DSS1.

As a result of the hybrid network scenario, the protocol of the second signaling connection SIP [B], SS7, DSS1 is converted several times in a known manner, and specifically the protocol SIP [B], which is used between the server and the IP-PSTN gateway MGC, is converted by the IP-PSTN gateway MGC into the protocol SS7 of the network PSTN, and this is then converted by the switching node STP (Signaling Transfer Point) into the protocol DSS1 of the subscriber connection interface. These conversions remain hidden from the server S, and therefore the second signaling connection SIP [B], SS7, DSS1 exists virtually between the server S and the subscriber B. In other words, the IP-PSTN gateway MGC functions as a proxy of the subscriber B in relation to the server S.

In addition to setting up a continuous signal connection SIP, SS7, DSS1, there is also a requirement for the through-connection of a speech/data channel connection/bearers RTP, TDM between the subscribers A and B. This is composed of a packet-oriented bearer RTP in the network IN and a line-oriented bearer TDM in the network PSTN. The endpoints of the bearer RTP in the network IN are the Media Gateway MG and the VoIP client C of the subscriber A in this case, and those of the bearer TDM in the network PSTN are the Media Gateway MG and the conventional telephone T of the subscriber B.

The web/application server S supports the reciprocal exchange of information which is required for establishing the packet-oriented bearer RTP in this case. This exchange takes place e.g. using the protocol SDP (Session Description Protocol) which is part of SIP. Particularly noteworthy advantages are produced in this case if the standard sequence as per the SIP Offer-Answer model is retained. This standard sequence provides for inserting a data record SDP in the message SIP:INVITE on the side of the calling subscriber, said data record also containing inter alia a list of all CODECs that are supported on the side of the calling subscriber (=Offer), and for inserting a data record SDP in the message 200 OK on the side of the called subscriber, said data record indicating the CODEC that is to be used for the subsequent call CALL (=Answer). This support is explained in greater detail in the flow diagram of FIG. 2:

Firstly, a message SIP:INVITE is sent from the server S to the IP-PSTN gateway MGC. This message could actually already contain the IP address of the client C, because this is already known when the first HTTP message arrives. For a successful setup of the bearer RTP, however, at least the specification of the port of the client C and the list of the CODECs which are supported by the client C are still missing at this time point, and therefore the message SIP:INVITE does not contain an SDP data record or at least does not contain a complete SDP data record.

The IP-PSTN gateway MGC then uses a message 100 TRYING, to show the server S that an attempt is being made to reach the subscriber B, and performs the known setup of the bearer TDM in the network PSTN. In this context, one PSTN port leading into the network PSTN and one RTP port leading into the network IP are occupied in the Media Gateway MG. The signaling between the IP-PSTN gateway MGC and the subscriber B as per the protocol SS7 (particularly the protocol ISUP in this case) and the protocol DSS1 belongs to the prior art and is not described in further detail. The same applies to the signaling between the IP-PSTN gateway MGC and the Media Gateway MG using the protocols MGCP or H.248.

After successful setup of the bearer TDM, the ring tone is applied in the network PSTN and transferred as far as the Media Gateway MG in the bearer TDM. The message 180 RINGING is sent to the server by the IP-PSTN gateway MGC, said message containing a complete data record SDP [MG], in particular the RTP port in the gateway MG and the list of CODECs supported by the RTP port of the Media Gateway MG.

The data record SDP [MG] is used by the server S to generate a message SIP:INVITE which contains a full data record SDP in the sense of an Offer. This message SIP: INVITE (SDP [MG]) is sent to the subscriber A. In other words: the message SIP:INVITE in the direction of the subscriber A is delayed in this exemplary embodiment until the data record SDP [MG of the] Media Gateway MG is received by the server S. It is clear that this sequence could also be varied in accordance with the Offer/Answer model of SIP. However, the sequence described here results in the above described standard sequence in the direction of the client C. This has the particularly noteworthy advantage that this sequence should be supported by all SIP clients C.

Following receipt of the message SIP:INVITE, the VoIP client C of the subscriber starts with the indication of the incoming call. This is indicated to the server by means of the usual messages 100 TRYING and 180 RINGING. As soon as the subscriber A accepts the call, a message 200 OK is sent to the server S. A data record SDP [A] is inserted at the latest in this message, said data record indicating inter alia the port of the VoIP client C and the selected CODEC. The bearer RTP can already become unidirectionally operational from the client C in the direction of the Media Gateway MG.

In order to activate the opposite direction from the Media Gateway MG to client C, it is still necessary to forward the data record SDP [A] to the Media Gateway MG. As soon as this data is forwarded to the Media Gateway MGC by the server S, the bearer RTP can become bidirectionally operational. The subscribers A and B can then talk to each other.

One possibility for forwarding the data SDP [A] consists in communicating it to the IP-PSTN gateway using the message SIP:ACK, which is transferred as confirmation of the message 200 OK, said confirmation indicating that the subscriber B has accepted the incoming call.

A further possibility consists in forwarding the data SDP [A] by means of a special message SIP:xxx immediately after it is received. This has the advantage that, upon receipt of the data SDP [A], the RTP port of the Media Gateway MG can be activated and the call tone which is already present from the network PSTN can also be transferred to the client C as tones or announcements (busy, error event, etc.) until the destination subscriber B lifts the handset.

The message SIP:XXX can be configured as message SIP: UPDATE. Admittedly, this represents a deliberate contravention of the Offer-Answer model, because the message SIP: UPDATE essentially represents a new Offer. However, this can be compensated by a corresponding adaptation of the IP-PSTN gateway MGC.

Alternatively, the message SIP:XXX can be configured as message SIP:PRACK. Providing a basis for this alternative, the IP-PSTN gateway MGC is notified in the preceding message SIP:INVITE that "reliable provisional responses" are supported. In this case, the IP-PSTN gateway MGC already transfers the data SDP [MG] in the message 180 RINGING, and then waits for the message SIP:PRACK as confirmation. The data SDP [A] which is received from subscriber A is then inserted into this confirmation. In this case, the sending of the message SIP:PRACK from the server S is delayed until the message 200 OK has been received from the subscriber A.

As a variant, the data SDP [A] can be transferred using the message SIP:ACK (SDP [A]) in each case, independently of the transfer using a special message SIP:XXX. Therefore the server S also supports Media Gateways MG whose associated IP-PSTN gateway MGC does not support the receipt of a special message SIP:XXX.

In the event that the subscriber B lifts the handset before the subscriber A takes the call that is passed to him/her, an announcement can be activated for the subscriber B, e.g. by means of a Bearer Redirection method, indicating that this is a VoIP call and requesting that the subscriber B wait until the connection is established.

As soon as the web/application server S has received both messages 200 OK in response to the outgoing messages SIP: INVITE, it initiates the charging for the call CALL. The charging ends as soon as the web/application server receives a message SIP:BYE from one of the participating endpoints. For example, a terminating data record for the charging is written in this case.

According to a further embodiment of the invention, the existence of the bearer RTP is checked at cyclical intervals. In this way, the charging can be terminated advantageously if the client software C crashes. The protocol SIP includes a Session Timer mechanism for this purpose, and this mechanism could be used here for example.

In conclusion, it is emphasized that the description of the communication network components which are relevant for the invention must not be understood to be restrictive in any way. In particular, it is obvious to a person skilled in the relevant art that terms such as application, client, server, gateway, controller, etc. must be understood in a functional sense and not in a physical sense. For example, therefore, the endpoints A, B can also be partly or completely implemented in software and/or distributed over a plurality of physical devices.

The invention claimed is:

1. A method for connecting subscribers using at least on communication network, comprising:

capturing data characteristic of a first subscriber and a second subscriber by a server;

initiating a first signaling connection between the first subscriber and the server;

receiving an offer from the first subscriber by the server;

initiating a second signaling connection between the second subscriber and the server by using the received offer;

linking the first and second signaling connections together to form a continuous signaling connection between the subscribers, wherein the server is configured as a WEB application which is accessed via an Internet and/or an Internet protocol, and the IP address of the first or second subscriber is captured as characterizing data after the respective subscriber accesses the WEB application; and querying the subscribers which accessed the WEB application by using the captured IP address, the query to determine which software is use for transferring information into the communication network by queried subscriber.

2. The method according to claim 1, wherein captured data includes information to determine the identity of at least one of the subscribers.

3. The method according to claim 2, further comprising: receiving a registration to determine the identity of the subscriber.

4. The method according to claim 1, further comprising: supporting the exchange of information used to establish a bearer between the subscribers.

5. The method according to claim 4, wherein the existence of the bearer is checked by the server by using a timer mechanism.

6. The method according to claim 4, wherein a charging data record is logged, from which a duration of the existence of the bearer can be derived.

7. The method according to claim 1, wherein the server is assigned to a PSTN operator.

8. The method according to claim 1, wherein the charging for those subscribers who are assigned to the PSTN of the operator takes place via the telephone bill of the PSTN operator.

9. The method according to claim 1, wherein captured data includes information to determine the identity of at least one of the subscribers.

10. The method according to claim 1, wherein the offer is in accordance with a Session Description Protocol.

11. A server for connecting subscribers using at least on communication network, comprising:
   a first data characterizing a first subscriber;
   a second data characterizing a second subscriber;
   a first signaling connection between the first subscriber and the server; and
   a second signaling connection between the second subscriber, wherein the offer received by the server from the first subscriber during an initiation of the first signaling connection is used in an initiation of the second signaling connection, and wherein the first and second signaling connections are linked together to form a third signaling connection between the two subscribers, wherein the server is configured as a WEB application which is accessed via an Internet and/or an Internet protocol, and
   an IP address of the first or second subscriber is captured as characterizing data after the respective subscriber accesses the WEB application; and
   querying the subscribers which accesed the WEB application by using the captured IP address, the query to determine which software is used for transferring information into the at least one communication network by queried subscriber.

12. The server according to claim 11, wherein captured data includes information to determine the identity of at least one of the subscribers.

13. The server according to claim 11, further comprising: receiving a registration to determine the identity of the subscriber.

14. The server according to claim 11, wherein a charging data record is logged, from which a duration of the existence of the bearer can be derived.

15. The method according to claim 11, wherein the offer is in accordance with a Session Description Protocol.

16. A computer readable medium having computer-executable instructions for a WEB application for connection of subscribers in hybrid communication networks, comprising:
   capturing an IP address of a calling subscriber having accessed the WEB application;
   capturing data provided by the calling subscriber characterizing a called subscriber;
   initiating a first signaling connection between the called subscriber and the WEB application;
   receiving an offer from the called subscriber by the server;
   initiating a second signaling connection between the calling subscriber and the WEB application by using the offer from the called subscriber;
   linking the first and second signaling connections together to form a third signaling connection between the subscribers;
   supporting the exchange of information used to establish a bearer between the subscribers, wherein a charging data record is logged, from which a duration of the existence of the bearer can be derived, and wherein the offer is in accordance with a Session Description Protocol; and
   querying subscriber which accessed the WEB application by using the captured IP, the query to determined which software is used for transferring information into the communication network by queried subscriber.

* * * * *

UNITED STATES PATENT AND TRADEMARK OFFICE
CERTIFICATE OF CORRECTION

| | | |
|---|---|---|
| PATENT NO. | : 7,539,178 B2 | Page 1 of 1 |
| APPLICATION NO. | : 10/566778 | |
| DATED | : May 26, 2009 | |
| INVENTOR(S) | : Norbert Huffschmid | |

It is certified that error appears in the above-identified patent and that said Letters Patent is hereby corrected as shown below:

Title page, Item (73) should read as follows:

Assignee: (73) Nokia Siemens Networks GmbH & Co. KG
Muenchen, Germany (DE)

Signed and Sealed this
Twenty-sixth Day of July, 2011

David J. Kappos
*Director of the United States Patent and Trademark Office*